(12) United States Patent
Hansen et al.

(10) Patent No.: US 7,444,783 B1
(45) Date of Patent: Nov. 4, 2008

(54) RODENT ENTRANCE BLOCKING DEVICE AND METHOD

(76) Inventors: Adam L. Hansen, 742 Merrill La., Grayslake, IL (US) 60030; Kelly M. Hansen, 742 Merrill La., Grayslake, IL (US) 60030

( * ) Notice: Subject to any disclaimer, the term of this patent is extended or adjusted under 35 U.S.C. 154(b) by 433 days.

(21) Appl. No.: 11/154,611

(22) Filed: Jun. 17, 2005

(51) Int. Cl.
*E04B 1/72* (2006.01)

(52) U.S. Cl. .......................................... 52/101; 49/131

(58) Field of Classification Search ................... 52/101, 52/204.1, 202, 317, 211; 15/257.1; 49/466, 49/70, 131, 132, 467, 142, 143, 61, 62, 67, 49/58–60, 139, 305, 469, 480.1, 63, 104; 187/400; 43/61; 119/482, 705, 843
See application file for complete search history.

(56) References Cited

U.S. PATENT DOCUMENTS

| | | | | |
|---|---|---|---|---|
| 605,301 | A | * | 5/1898 | Clabaugh .................... 15/257.1 |
| 1,944,349 | A | * | 1/1934 | Kincaid ........................ 49/131 |
| 2,473,125 | A | * | 6/1949 | Alexander .................. 187/400 |
| 3,816,610 | A | | 6/1974 | Lusby |
| 3,861,081 | A | * | 1/1975 | Maskell .......................... 49/70 |
| 4,404,769 | A | | 9/1983 | Casbeer, Jr. |
| 5,465,532 | A | | 11/1995 | Varin |
| D367,538 | S | | 2/1996 | Varin |
| 5,979,123 | A | | 11/1999 | Brockman |
| 6,173,535 | B1 | | 1/2001 | Beischl et al. |
| 6,411,583 | B1 | * | 6/2002 | Yamamoto et al. .......... 720/647 |
| 6,591,553 | B1 | * | 7/2003 | Vaughn ....................... 49/466 |

FOREIGN PATENT DOCUMENTS

GB  2352754 A  *  2/2001

* cited by examiner

*Primary Examiner*—Robert Canfield
*Assistant Examiner*—Bryan Eppes

(57) ABSTRACT

A rodent entrance blocking device and method includes a doorframe that has a first vertical support and a second vertical support. A base has a bottom side, a top side, a first lateral side and a second lateral side. A distance from the first lateral side to the second lateral side is substantially equal to a distance between the first and second vertical supports. A rigid plate has a bottom edge, a top edge, a first side edge and a second side edge. The bottom edge is hingedly coupled to top side of the base. The plate extends between the first and second lateral sides. A biasing member is mechanically coupled to the plate and biases the plate in a vertical orientation. The base is positioned between the first and second vertical supports of the doorframe. The base extends between the first and second vertical supports.

3 Claims, 3 Drawing Sheets

RODENT ENTRANCE BLOCKING DEVICE AND METHOD

BACKGROUND OF THE INVENTION

1. Field of the Invention

The present invention relates to rodent blocking devices and more particularly pertains to a new rodent blocking device for preventing rodents from entering, such as a restaurant, while allowing the door to remain in an open position.

2. Description of the Prior Art

The use of rodent blocking devices is known in the prior art. U.S. Pat. No. 3,816,610 describes a foamed material that is positionable in a rodent tunnel to prevent usage of the tunnel by the rodent. Another type of rodent blocking device is U.S. Pat. No. 4,404,769 which includes a rodent barrier that is adapted for blocking the area around a railroad track extending through a warehouse door. A shield device for buildings during their construction is found in U.S. Pat. No. 5,979,123.

While these devices fulfill their respective, particular objectives and requirements, the need remains for a device that will prevent rodents from entering a dwelling through a doorway, while still allowing for people to enter the dwelling through the doorway. The device should be easily collapsible so that the door of the dwelling may be retained in an open position.

SUMMARY OF THE INVENTION

The present invention meets the needs presented above by generally comprising a doorframe that has a first vertical support and a second vertical support. A base has a bottom side, a top side, a first lateral side and a second lateral side. A distance from the first lateral side to the second lateral side is substantially equal to a distance between the first and second vertical supports. A rigid plate has a bottom edge, a top edge, a first side edge and a second side edge. The bottom edge is hingedly coupled to top side of the base. The plate extends between the first and second lateral sides. A biasing member is mechanically coupled to the plate and biases the plate in a vertical orientation. The base is positioned between the first and second vertical supports of the doorframe. The base extends between the first and second vertical supports.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
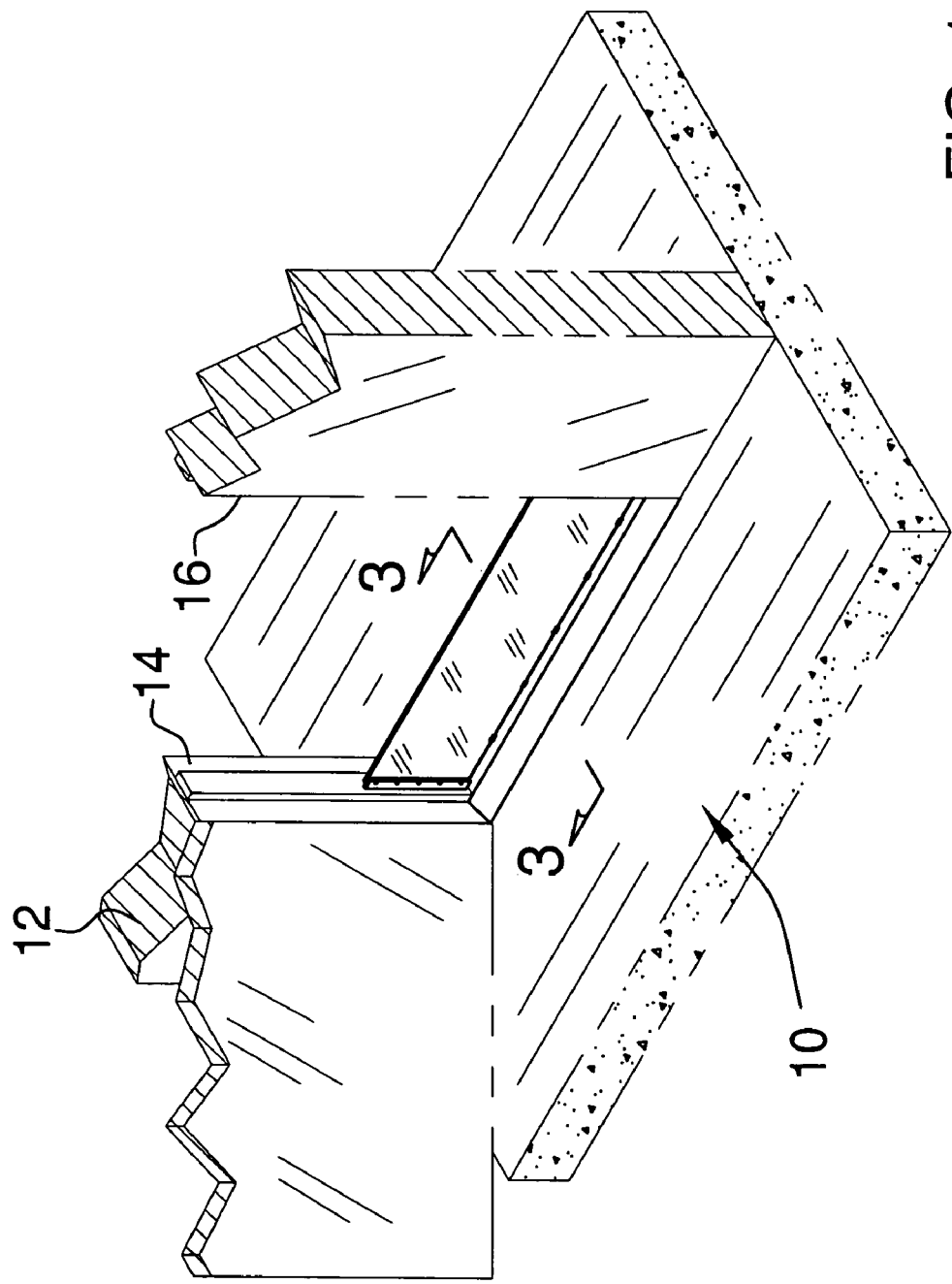
FIG. 1 is a perspective view of a rodent entrance blocking device and method according to the present invention.
Figure 2:
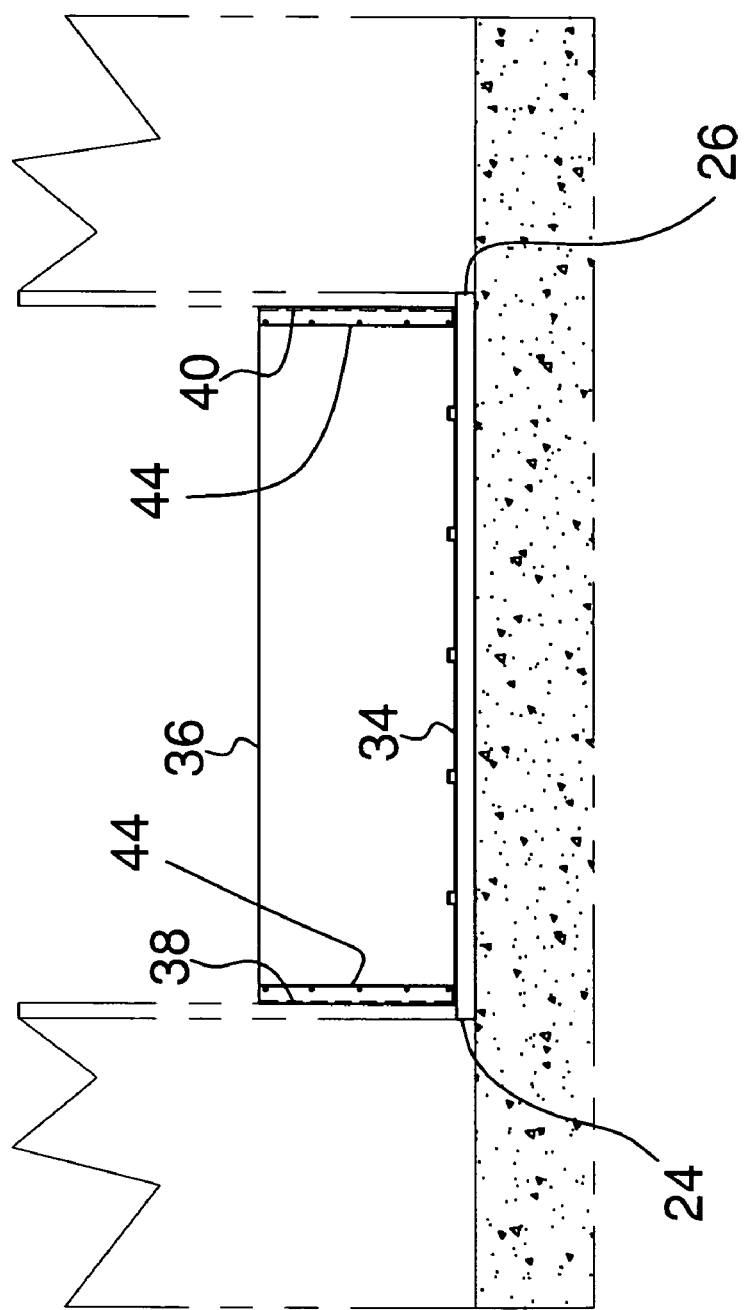
FIG. 2 is a front view of the present invention.
Figure 3:
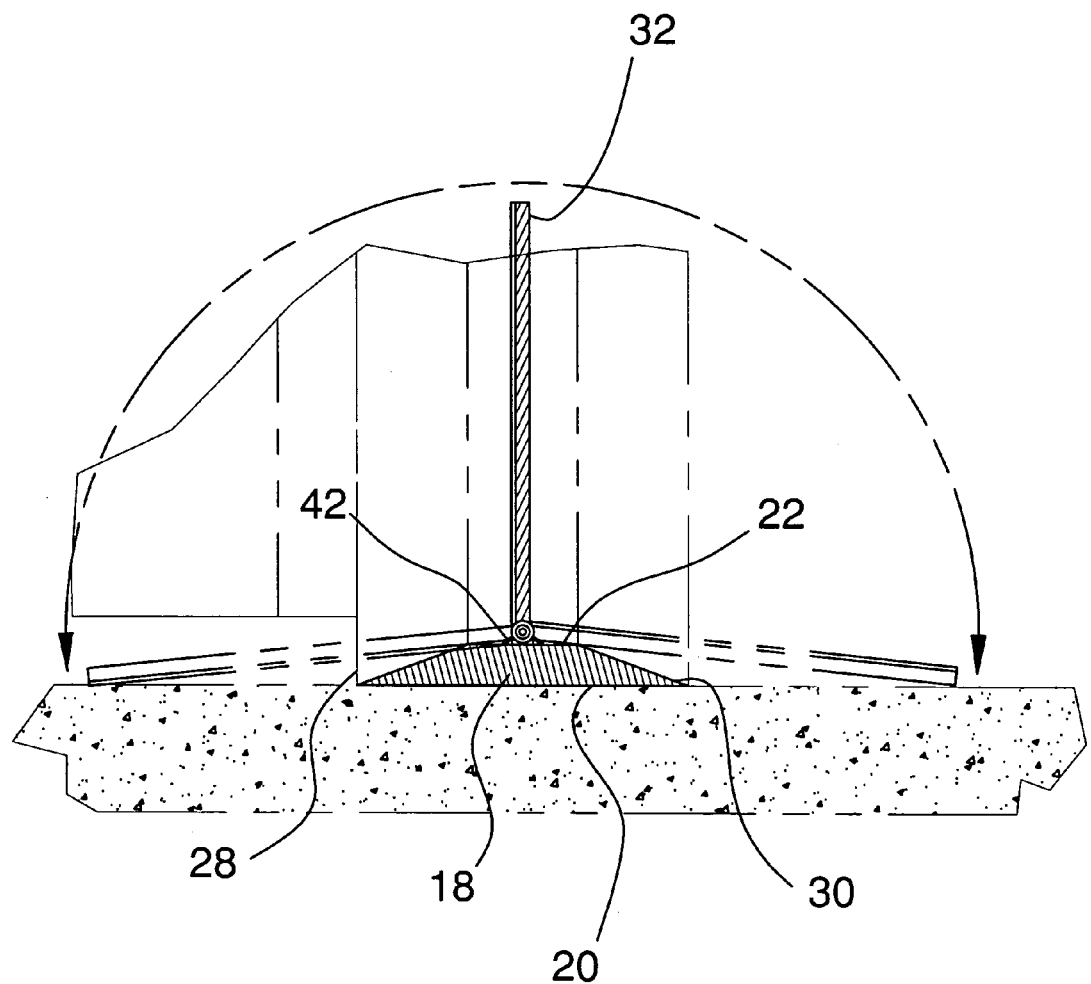
FIG. 3 is a cross-sectional view taken along line 3-3 of FIG. 2 of the present invention.

With reference now to the drawings, and in particular to FIGS. 1 through 3 thereof, a new rodent blocking device embodying the principles and concepts of the present invention and generally designated by the reference numeral 10 will be described.

As best illustrated in FIGS. 1 through 3, the rodent entrance blocking device and method 10 generally comprises a conventional doorframe 12 that has a first vertical support 14 and a second vertical support 16.

A base 18 is provided that has a bottom side 20, a top side 22, a first lateral side 24 and a second lateral side 26. A distance from the first lateral side 24 to the second lateral side 26 is substantially equal to a distance between the first 14 and second 16 vertical supports. The base 18 also includes front 28 and rear 30 edges and the top side 22 is preferably angled downward from a central area of said top side 22 to said front 28 and rear 30 edges. The base 18 has a height less than 2 inches.

A rigid plate 32 has a bottom edge 34, a top edge 36, a first side edge 38 and a second side edge 40. The bottom edge 34 is hingedly coupled to top side of the base 18. The plate 32 extends between the first 24 and second 26 lateral sides. A biasing member 42 is mechanically coupled to the plate 32 and biases the plate 32 in a vertical orientation. The biasing member 42 is preferably includes one or more springs. The plate 32 has a height from the bottom edge 34 to the top edge 36 generally between 7 inches and 10 inches and has a thickness less than 1 inch. A pair of elongated panels 44 is also provided. Each of the panels 44 is resiliently flexible and is comprised of an elastomeric material.

In use, the base 18 is positioned between the first 14 and second 16 supports of the doorframe 12. The base 18 extends between the first 14 and second 16 vertical supports. Each of the panels 44 is attached to one of the first 14 and second 16 vertical supports so that each of the panels 44 extends upwardly from the top side 22 of the base 18. The plate 32 abuts the panels 44 when the plate 32 is in a vertical orientation. When a person walks through the doorframe 12, their weight may be used for holding the plate 32 down in a horizontal position. When they remove their weight, the plate 32 moves back to a vertical position to prevent rodents from traveling through the doorframe 12.

In use, the base 18 is positioned between the first 14 and second 16 supports of the doorframe 12. The base 18 extends between the first 14 and second 16 vertical supports. Each of the panels 44 is attached to one of the first 14 and second 16 vertical supports so that each of the panels 44 extends upwardly from the top side 20 of the base 18. The plate 32 abuts the panels 44 when the plate 32 is in a vertical orientation. When a person walks through the doorframe 12, their weight may be used for holding the plate 32 down in a horizontal position. When they remove their weight, the plate 32 moves back to a vertical position to prevent rodents from traveling through the doorframe 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of preventing rodents from entering a dwelling comprising the steps of:
   providing a doorframe having a first vertical support and a second vertical support;
   providing a base having a bottom side, a top side, a first lateral side and a second lateral side, a distance from said first lateral side to said second lateral side being substantially equal to a distance between said first and second vertical supports;
   providing a rigid plate having a bottom edge, a top edge, a first side edge and a second side edge, said bottom edge being hingedly coupled to top side of said base, said plate extending between said first and second lateral sides, a biasing member being mechanically coupled to said plate and biasing said plate in a vertical orientation;
   positioning said base between said first and second vertical supports of said doorframe, said base extending between said first and second vertical supports; providing a pair of elongated panels, each of said panels being resiliently flexible; and attaching each of said panels to one of said first and second vertical supports such that each of said panels extends upwardly from said top side of said base, said plate abutting said panels when said plate is in a vertical orientation.

2. The method according to claim 1, wherein said plate has a height from said bottom edge to said top edge generally between 7 inches and 10 inches.

3. A method of preventing rodents from entering a dwelling comprising the steps of:
   providing a doorframe having a first vertical support and a second vertical support;
   providing a base having a bottom side, a top side, a first lateral side and a second lateral side, a distance from said first lateral side to said second lateral side being substantially equal to a distance between said first and second vertical supports;
   providing a rigid plate having a bottom edge, a top edge, a first side edge and a second side edge, said bottom edge being hingedly coupled to top side of said base, said plate extending between said first and second lateral sides, a biasing member being mechanically coupled to said plate and biasing said plate in a vertical orientation, said plate having a height from said bottom edge to said top edge generally between 7 inches and 10 inches;
   providing a pair of elongated panels, each of said panels being resiliently flexible;
   positioning said base between said first and second vertical supports of said doorframe, said base extending between said first and second vertical supports; and
   attaching each of said panels to one of said first and second vertical supports such that each of said panels extends upwardly from said top side of said base, said plate abutting said panels when said plate is in a vertical orientation.

* * * * *